(12) United States Patent
Eggert

(10) Patent No.: US 7,014,448 B1
(45) Date of Patent: Mar. 21, 2006

(54) COMPACTING FACILITY FOR BULK GOODS

(75) Inventor: Axel Eggert, Monheim (DE)

(73) Assignee: Alexanderwerk AG, Remscheid (DE)

(*) Notice: Subject to any disclaimer, the term of this patent is extended or adjusted under 35 U.S.C. 154(b) by 0 days.

(21) Appl. No.: 10/130,554

(22) PCT Filed: Nov. 16, 2000

(86) PCT No.: PCT/EP00/11368

§ 371 (c)(1),
(2), (4) Date: Aug. 19, 2002

(87) PCT Pub. No.: WO01/36079

PCT Pub. Date: May 25, 2001

(30) Foreign Application Priority Data

Nov. 17, 1999 (DE) ................. 199 55 484
Feb. 19, 2000 (DE) ................. 100 07 731

(51) Int. Cl.
*B29C 45/18* (2006.01)
*B29C 47/10* (2006.01)
(52) U.S. Cl. ..................... 425/217; 425/580
(58) Field of Classification Search ........ 425/217, 425/580
See application file for complete search history.

(56) References Cited

U.S. PATENT DOCUMENTS

| 4,108,334 A | * | 8/1978 | Moller ............... 222/136 |
| 4,120,627 A | * | 10/1978 | Abe .................. 425/92 |
| 4,340,347 A | * | 7/1982 | Robertson ............ 425/217 |
| 4,416,607 A | * | 11/1983 | Winstead ............. 425/325 |
| 4,439,384 A | | 3/1984 | Bergendahl .......... 264/37.29 |
| 4,448,737 A | * | 5/1984 | Johnson .............. 264/53 |
| 4,931,243 A | * | 6/1990 | Henschel ............. 264/109 |
| 5,184,779 A | | 2/1993 | Wolff et al. ......... 241/3 |

FOREIGN PATENT DOCUMENTS

DE  38 06 398 A1  9/1989

\* cited by examiner

*Primary Examiner*—Duane Smith
*Assistant Examiner*—Emmanuel S. Luk
(74) *Attorney, Agent, or Firm*—Proskauer Rose LLP

(57) ABSTRACT

A compacting facility for bulk goods is disclosed. In order to generate flakes of homogeneous quality, the bulk good is conveyed to a roller press (4) via a screw conveyor (5). The roller press (4) is supplied with bulk goods of differing quality from two shafts (7,9) positioned one behind the other, the screw conveyor (5) being underfed from the first shaft (9) in the direction of conveyance with granulate, which is not suitable for further processing, arising after the roller press (4) and the rest of the feeding being from the last shaft (7) in the direction of conveyance.

3 Claims, 1 Drawing Sheet

COMPACTING FACILITY FOR BULK GOODS

BACKGROUND OF THE INVENTION

The present invention relates to a compacting facility for bulk goods having a roller press and a screw conveyor positioned before it, over which a feeding hopper is positioned as bulk good feeder.

Crude products, which are supplied as a powder or grain or a mixture thereof, are frequently not suitable for immediate further processing, e.g. into tablets in the pharmaceutical industry, because they have too high a proportion of air and/or are not sufficiently pourable. Compacting the crude products before the further processing and subsequently granulating them is known from the patent literature (German Patent 34 31 865 C2), but above all from practice. For compacting, for example, a roller press having a screw conveyor positioned before it is used. Using the screw conveyor, the crude product is fed into the roller gap from the feeding hopper under a certain pressure. Since the roller press is sealed on both sides and the screw conveyor is connected tightly to the roller gap, the air pressed out of the crude product during compacting must travel through the material flow in the screw housing against its direction of conveyance. The air may then only escape via the material column located in the feeding hopper, which, however, offers a certain resistance to the air as a function of its height and density. However, a part of the air also passes through the roller gap "explosively", due to which the roller press is stressed and runs noisily.

In compacting it is important that the flakes which arise during compacting are as homogeneous as possible, because this property directly affects the final product. If the crude product in the feeding hopper is not uniformly distributed in regard to the grain size or in regard to other properties, inhomogeneous flake qualities occur. This is particularly the case if a portion of the compacted material which does not have the desired grain size after granulation is recirculated to the feeding hopper. The direct recirculation of this compacted crude product is not unproblematic because the bulk densities of this compacted crude product and of the untreated crude product are very different. An untreated product, which has a bulk density of 200 g/l, may have a bulk density of 800 g/l as the recirculated material after compacting. This is made more difficult because the mass flow of the recirculated product varies greatly. For soft flakes, the proportion of the mass flow of the recirculated product fed to the roller press is large, which has a favorable effect on homogeneous flake quality, but this in turn has the consequence that the mass flow of the recirculated material falls. Therefore, stabilization of the flake quality only occurs slowly in the process. For this reason, until now the mass flow of the recirculated material was subjected to an additional mixing procedure with the crude product before compacting.

Furthermore, a compacting facility for bulk goods is known (German Patent Application 38 06 398 A1), in which a feeding hopper having two shafts is positioned over a roller press, from which the roller gap may be fed in parallel with various types of bulk goods. The proportions of the various types of bulk goods which are fed to the roller gap from the various shafts may be adjusted by a metering element. Separate premixing of the bulk goods before the roller gap is not provided. The bulk goods come out of the roller gap pulverized and partially agglomerated, i.e., compressed into flakes. As a rule, the flakes are ground in a ball mill to the final fineness and supplied to a sifter, whose coarse output is recirculated as a fine product into the shaft having the fine product feed. The deaeration of the bulk goods occurs via the material column in the shaft for the coarse bulk good.

SUMMARY OF THE INVENTION

The object of the present invention is to provide a facility for compacting powdered and granulated products which produces a compacted product which is as homogeneous as possible.

This object is achieved according to the present invention in a compacting facility of the type initially described in that the feeding hopper has at least two shafts, which lie one behind the other in the direction of conveyance of the screw conveyor, from which the screw conveyor is fed with different types of bulk goods and is underfed up to the last shaft in the direction of conveyance, a granulator having a separating device for the granulate being connected inline downstream from the roller press, which separates the granulate according to the grain size, and recirculation of granulate unsuitable immediate further processing going from the separating device to a forward shaft in the direction of conveyance for.

Using the compacting facility according to the present invention, a homogeneous flake quality is ensured over the entire production process. For this purpose, it is essential that the crude product and further components are supplied in parallel to the screw conveyor from the various shafts from the beginning. This is possible because the components from the forward shaft(s) in the direction of conveyance only partially feed the screw conveyor, while the crude product from the last shaft fills up the screw conveyor. Due to the separated material supply occurring in the direction of conveyance of the screw conveyor, which includes the granulate recirculated by the separating device, optimum mixing of the material to be compacted results in combination with the multiple screw conveyor acting as a mixer. It is favorable for deaeration that air which is pressed out must no longer travel through the entire material column in the last shaft, which is full as a rule, but rather only the material columns, which are small in any case, in one or another of the upstream shafts, which are practically empty as a rule.

Since the proportion of the material not suitable for immediate further processing to be recirculated is slight as a rule, it is ensured that the shaft of the feeding hopper which has this material applied to it is only partially filled in any case, so that deaeration is possible via this shaft without great resistance.

Preferably, a first shaft in the forward direction is fed with a granulate having a larger grain. "Larger grain" is to mean that it has a larger grain as the crude product. It has been shown that this material is well suitable for cleaning the spirals and also as a feed aid in the roller press.

BRIEF DESCRIPTION OF THE DRAWING

In the following, the present invention is described in more detail with reference to the following drawing.

DETAILED DESCRIPTION OF THE INVENTION

Figure 1:
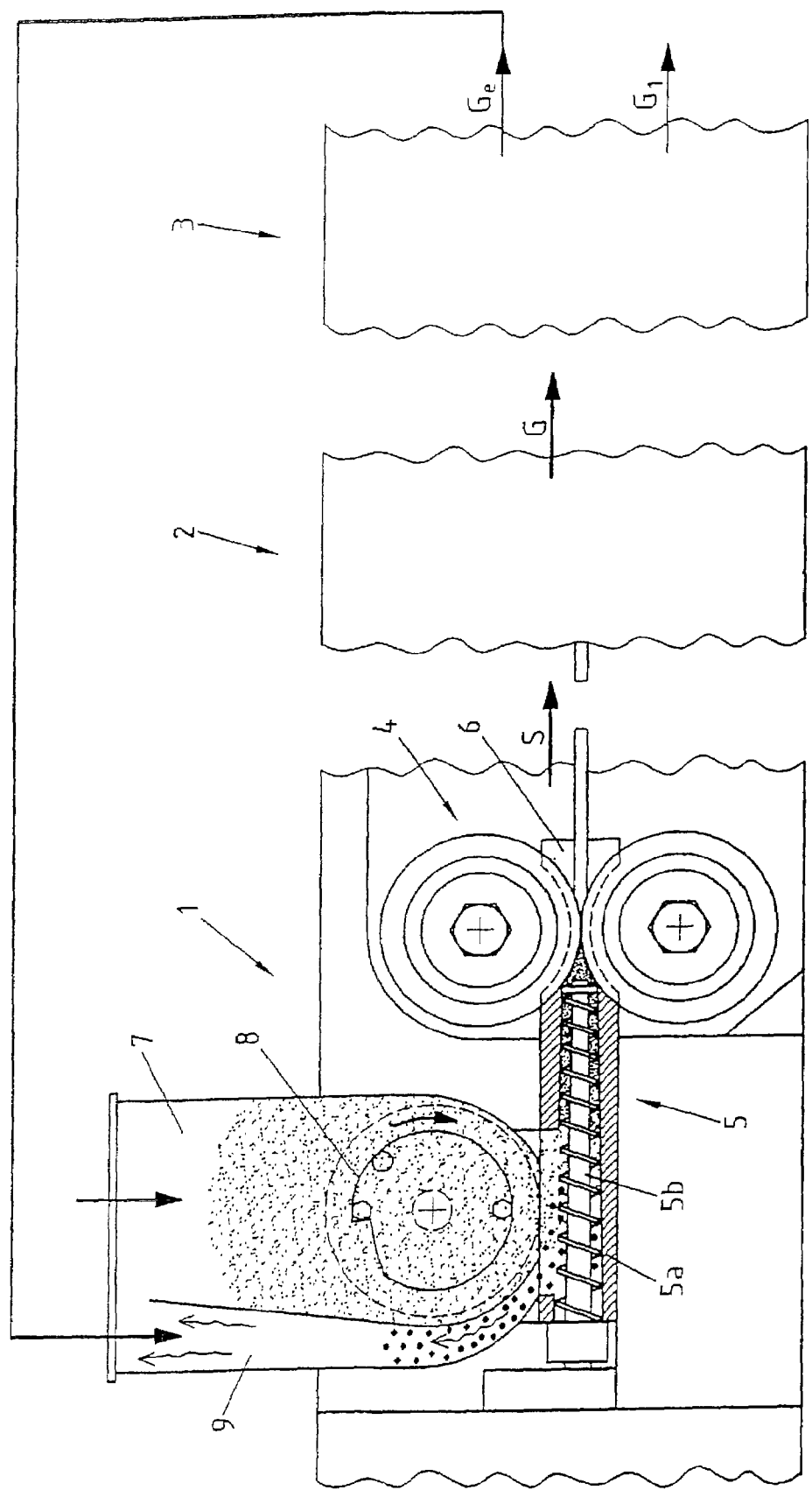
FIG. 1 illustrates the compacting facility in a partial schematic according to embodiment of the invention.

The compacting facility is made of a part 1 for compacting the crude product, a part 2 for granulating, and a part 3 for sieving the granulate.

First part 1 includes a roller press 4 having horizontal material supply. The material to be compacted is supplied to the roller gap of roller press 4 under pressure via a screw conveyor 5 having screw housing 5a and multiple screw 5b for mixing the material supplied. Screw conveyor 5 is tightly connected to the roller gap.

Roller press 4 is laterally sealed by cover plates 6. A feeding hopper for powdered to granulated product, which is divided into a forward shaft 7 and a rear shaft 9, is located over screw conveyor 5. A rotor 8 is positioned in shaft 7 for moving the crude product so that it does not remain hanging in shaft 7.

The powdered crude product is introduced into shaft 7. Screw conveyor 5 feeds it under pressure into the roller gap of roller press 4, where it is compacted into flakes S. Flakes S are subsequently granulated in part 2 of the facility. Since granulate G normally has a broad grain palette, it is not well suitable for further processing. Therefore, in an adjoining part 3 of the facility, it is separated into a granulate $G_1$ suitable for further processing and a granulate $G_2$ to be recirculated into shaft 9 of the feeding hopper. The mass flow of granulate $G_2$ is small, so that screw conveyor 5 is only partially fed with it. The rest of the feeding is from the untreated material in shaft 7. Therefore, even at a very early time in the production process, the screw conveyor is fed in parallel with material of various qualities from multiple shafts 7, 9. This has a positive effect on the desired homogeneous flake quality.

What is claimed is:

1. A compacting facility for bulk goods comprising:
    a roller press;
    a screw conveyor oriented horizontally and having a horizontal direction of conveyance, said screw conveyor being positioned upstream from the roller press;
    a feeding hopper positioned as a bulk goods feeder over said screw conveyor, the feeding hopper comprising at least a downstream shaft and an upstream shaft which lie above the screw conveyor and are aligned one behind the other relative to the direction of conveyance of the screw conveyor, the upstream shaft and the downstream shaft being oriented substantially perpendicularly to the direction of conveyance, the screw conveyor, the upstream shaft, and the downstream shaft being configured such that said screw conveyor receives various types of bulk goods from said downstream shaft and said upstream shaft at two separate locations which are offset from each other, and
    a granulator for granulating the bulk goods being located downstream from the roller press, the granulator comprising a separating device which separates granulated bulk goods according to grain size, and which recirculates the granulated bulk goods unsuitable for immediate processing back to the upstream shaft to be fed to the screw conveyor, whereby recirculated granulated bulk goods from the upstream shaft and bulk goods from the downstream shaft become mixed in the screw conveyor.

2. The compacting facility according to claim 1 wherein the screw conveyor comprises multiple screws for mixing bulk goods.

3. The compacting facility according to claim 1 wherein the recirculated granulated bulk goods received by the upstream shaft is of larger grain than the bulk goods in the downstream shaft.

* * * * *